US011632333B2

(12) United States Patent
Singamsetty (10) Patent No.: US 11,632,333 B2
(45) Date of Patent: Apr. 18, 2023

(54) SYSTEM AND METHOD FOR IMPLEMENTATION OF A DISTRIBUTED DATA FLOW-BASED FRAMEWORK

(71) Applicant: Sayantek, Inc, San Jose, CA (US)

(72) Inventor: Murali Kumar Singamsetty, San Jose, CA (US)

(73) Assignee: Sayantek, Inc, San Jose, CA (US)

( * ) Notice: Subject to any disclaimer, the term of this patent is extended or adjusted under 35 U.S.C. 154(b) by 406 days.

(21) Appl. No.: 17/095,783

(22) Filed: Nov. 12, 2020

(65) Prior Publication Data
US 2021/0152483 A1 May 20, 2021

Related U.S. Application Data

(60) Provisional application No. 62/935,520, filed on Nov. 14, 2019.

(51) Int. Cl.
*H04L 47/2483* (2022.01)
*H04L 69/163* (2022.01)
(Continued)

(52) U.S. Cl.
CPC ........ *H04L 47/2483* (2013.01); *H04L 41/085* (2013.01); *H04L 41/0883* (2013.01);
(Continued)

(58) Field of Classification Search
None
See application file for complete search history.

(56) References Cited

U.S. PATENT DOCUMENTS 10,127,022 B2 11/2018 Sharma et al.
2015/0288569 A1* 10/2015 Agarwal ................. H04L 41/12
  709/224
2016/0234073 A1* 8/2016 Maes ...................... G06F 16/23
(Continued)

FOREIGN PATENT DOCUMENTS

CN 106936625 A * 7/2017 ......... H04L 41/0823

OTHER PUBLICATIONS

Author Unknown, TOSCA Simple Profile in YAML Version 1.2, pp. 1-348, Aug. 31 (Year: 2017).*
(Continued)

*Primary Examiner* — Christopher M Crutchfield
(74) *Attorney, Agent, or Firm* — Jason C. Cameron (57) ABSTRACT

A system for implementing for implementing a distributed data flow framework. A controller creates a flow configuration file for at least one runtime. A distributed data flow deployment subsystem deploys one or more nodes and one or more interconnecting wires of the at least one runtime. A flow neighbour identification subsystem identifies one or more flow neighbours associated with the at least one runtime, determines a publisher and subscriber service information for each of the one or more flow neighbours. A bridge wire identification subsystem identifies one or more socket roles and a unique identification number corresponding to each of the one or more flow neighbours, enables the at least one runtime to establish a transmission control protocol connection with each of the one or more flow neighbours directly, implements one or more bridge wires with the at least one runtime and the one or more flow neighbours.

16 Claims, 8 Drawing Sheets

(51) Int. Cl.
  *H04L 9/40* (2022.01)
  *H04L 41/085* (2022.01)
  *H04L 67/1087* (2022.01)
  *H04L 43/045* (2022.01)
  *H04L 41/08* (2022.01)

(52) U.S. Cl.
  CPC ............ *H04L 43/045* (2013.01); *H04L 63/02* (2013.01); *H04L 67/1091* (2013.01); *H04L 69/163* (2013.01)

(56) References Cited

U.S. PATENT DOCUMENTS

2016/0254957 A1* 9/2016 Maes .................. H04L 67/10 709/223
2016/0357523 A1 12/2016 Zhang et al.
2016/0371063 A1* 12/2016 Chiosi .................. G06F 8/35
2018/0173503 A1 6/2018 Ghasemizadeh et al.

OTHER PUBLICATIONS

Pramod Jamkhedkar, Aman Shaikh, Theodore Johnson, N. K. Shankaranarayanan, Yaron Kanza, Vladislav Shkapenyuk, A Graph Database fora Virtualized Network Infrastructure, pp. 1-12 (Year: 2010).*

A Fog-based Architecture and Programming Model for IoT Applications in the Smart Grid; Pan Wang, Shidong Liu, Feng Ye and Xuejiao Chen; 2018; arXiv preprint arXiv:1804.01239.

Toward a Distributed Data Flow Platform for the Web of Things; Michael Blackstock, Rodger Lea; Oct. 26-28, 2015; Internet of Things (IOT), 2015 International Conference on the, Seoul, Korea; Research Gate.

Developing IoT Applications in the Fog: A Distributed Dataflow Approach; Nam Ky Giang, Michael Blackstock, Rodger Lea, Victor C.M. Leung ; 2015; 5th International Conference on the Internet of Things (IoT).

* cited by examiner

SYSTEM AND METHOD FOR IMPLEMENTATION OF A DISTRIBUTED DATA FLOW-BASED FRAMEWORK

EARLIEST PRIORITY DATE

This application claims priority from a Provisional patent application filed in the United States of America having Patent Application No. 62/935,520, filed on Nov. 14, 2019, and titled "A METHOD OF IMPLEMENTING A DISTRIBUTED DATA FLOW SYSTEM OVER PEER-TO-PEER COMMUNICATING RUNTIMES".

BACKGROUND

Embodiment of a present disclosure relates to distributed computing and automation, and more particularly to a method of implementing a distributed data flow system over peer-to-peer communicating runtimes.

Dataflow programming is a design paradigm used to architect complex software systems. The data flow programming utilizes a concept of dataflow which is a directed acyclic graph (DAG) composed of 'nodes' and 'wires' that interconnects them. The nodes are asynchronous processing blocks in a system and the nodes are triggered by a message presented at its input or an event within the system. The nodes generate one or more messages which are then fed to other processing blocks as predetermined by how the nodes are interconnected by the wires in the dataflow. The wires connect the output port of a node to the input port of another node and determine how the nodes in the dataflow interact in the system in a sequential and event-driven manner. The objective of dataflow programming is to reduce or eliminate global state in the system. Generally, the global state increases complexity and makes the system prone to instabilities due to state misuses and corruptions. Various methods have been utilized conventionally for implementing data flow systems for peer-to-peer communication in various applications.

One such conventional method includes distributed data flow, its hub and spoke architecture in which participating runtimes have a reliance on a centralized message queuing telemetry transport (MQTT) message broker for exchanging data. However, such a conventional method for implementing the dataflow system for large scale edge deployments requires a central broker at each of the edge sites in addition to a cloud or data-centre-based broker to interconnect these sites. Also, every runtime is connected to the central broker and requires an involvement of the central broker for communication with other runtimes. Moreover, presence of the central broker increases latency and increases the overall system complexity. Furthermore, the presence of the central broker limits the scalability of the data flow system and increase the total cost of ownership of such system.

Hence, there is a need for an improved system and a method for implementing a distributed data flow framework over peer-to-peer communicating runtimes in order to address the aforementioned issue(s).

BRIEF DESCRIPTION

In accordance with an embodiment, of the present disclosure, a system for implementing a distributed data flow framework is disclosed. The system includes a controller configured to register at least one runtime of the distributed data flow-based framework by capturing one or more distributed data flow details from a user. The controller is also configured to create a flow configuration file of a predefined format for the at least one runtime upon registration of the at least one runtime. The system also includes a distributed data flow deployment subsystem operatively coupled to the controller. The distributed data flow deployment subsystem is configured to deploy one or more nodes and one or more interconnecting wires of the at least one runtime based on one or more identified portions of the distributed data flow framework from the flow configuration file created. The system also includes a flow neighbour identification subsystem operatively coupled to the distributed data flow deployment subsystem. The flow neighbour identification subsystem is configured to identify one or more flow neighbours associated with the at least one runtime of the distributed data flow-based framework based on data flow configuration information extracted from the flow configuration file created. The flow neighbour identification subsystem is also configured to determine a publisher and subscriber service information for each of the one or more flow neighbours identified based on the data flow configuration information extracted. The system also includes a bridge wire identification subsystem operatively coupled to the flow neighbour identification subsystem. The bridge wire identification subsystem is configured to identify one or more socket roles and a unique identification number corresponding to each of the one or more flow neighbours from the flow configuration file upon determination of the publisher and the subscriber service information. The bridge wire identification subsystem is also configured to enable the at least one runtime to establish a transmission control protocol connection with each of the one or more flow neighbours based on an identification of corresponding one or more socket roles and the unique identification number. The bridge wire identification subsystem is also configured to enable the at least one runtime to establish a publisher-subscriber relationship for forwarding flow messages based on the transmission control protocol connection established between the at least one run-time and the one or more flow neighbours. The bridge wire identification subsystem is also configured to implement one or more bridge wires with the at least one runtime and the one or more flow neighbours for implementation of the distributed data flow-based framework based on the publisher-subscriber relationship established.

In accordance with another embodiment of the present disclosure, a method for implementing a distributed data flow framework is disclosed. The method includes registering, by a controller, at least one runtime of the distributed data flow-based framework by capturing one or more distributed data flow details from a user. The method also includes creating, by the controller, a flow configuration file of a predefined format for the at least one runtime upon registration of the at least one runtime. The method also includes deploying, by a distributed data flow deployment subsystem, one or more nodes and one or more interconnecting wires of the at least one runtime based on one or more identified portions of the distributed data flow framework from the flow configuration file created. The method also includes identifying, by a flow neighbour identification subsystem, one or more flow neighbours associated with the at least one runtime of the distributed data flow-based framework based on data flow configuration information extracted from the flow configuration file created. The method also includes determining, by the flow neighbour identification subsystem, a publisher and subscriber service information for each of the one or more flow neighbours identified based on the data flow configuration information extracted. The method also includes identifying, by a bridge wire identification subsystem, one or more socket roles and a unique identification number corresponding to each of the one or more flow neighbours from the flow configuration file upon determination of the publisher and the subscriber service information. The method also includes enabling, by the bridge wire identification subsystem, the at least one runtime to establish a transmission control protocol connection with each of the one or more flow neighbours based on an identification of corresponding one or more socket roles and the unique identification number. The method also includes enabling, by the bridge wire identification subsystem, the at least one runtime to establish a publisher-subscriber relationship for forwarding flow messages based on the transmission control protocol connection established between the at least one run-time and the one or more flow neighbours. The method also includes implementing, by the bridge wire identification subsystem, one or more bridge wires with the at least one runtime and the one or more flow neighbours for implementation of the distributed data flow-based framework based on the publisher-subscriber relationship established.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 7 (a) is a flow chart representing the steps involved in a method for implementing a distributed data flow framework in accordance with the embodiment of the present disclosure; and FIG. 7 (b) depicts continued steps of flow chart of FIG. 7 (a) in accordance with the embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for implementing a distributed data flow framework. The system includes a controller configured to register at least one runtime of the distributed data flow-based framework by capturing one or more distributed data flow details from a user. The controller is also configured to create a flow configuration file in a predefined format for the at least one runtime upon registration of the at least one runtime. The system also includes a distributed data flow deployment subsystem operatively coupled to the controller. The distributed data flow deployment subsystem is configured to deploy one or more nodes and one or more interconnecting wires of the at least one runtime based on one or more identified portions of the distributed data flow framework from the flow configuration file created. The system also includes a flow neighbour identification subsystem operatively coupled to the distributed data flow deployment subsystem. The flow neighbour identification subsystem is configured to identify one or more flow neighbours associated with the at least one runtime of the distributed data flow-based framework based on data flow configuration information extracted from the flow configuration file created. The flow neighbour identification subsystem is also configured to determine a publisher and subscriber service information for each of the one or more flow neighbours identified based on the data flow configuration information extracted. The system also includes a bridge wire identification subsystem operatively coupled to the flow neighbour identification subsystem. The bridge wire identification subsystem is configured to identify one or more socket roles and a unique identification number corresponding to each of the one or more flow neighbours from the flow configuration file upon determination of the publisher and the subscriber service information. The bridge wire identification subsystem is also configured to enable the at least one runtime to establish a transmission control protocol connection with each of the one or more flow neighbours based on an identification of corresponding one or more socket roles and the unique identification number. The bridge wire identification subsystem is also configured to enable the at least one runtime to establish a publisher-subscriber relationship for forwarding flow messages based on the transmission control protocol connection established between the at least one run-time and the one or more flow neighbours. The bridge wire identification subsystem is also configured to implement one or more bridge wires with the at least one runtime and the one or more flow neighbours for implementation of the distributed data flow-based framework based on the publisher-subscriber relationship established.

Figure 1:
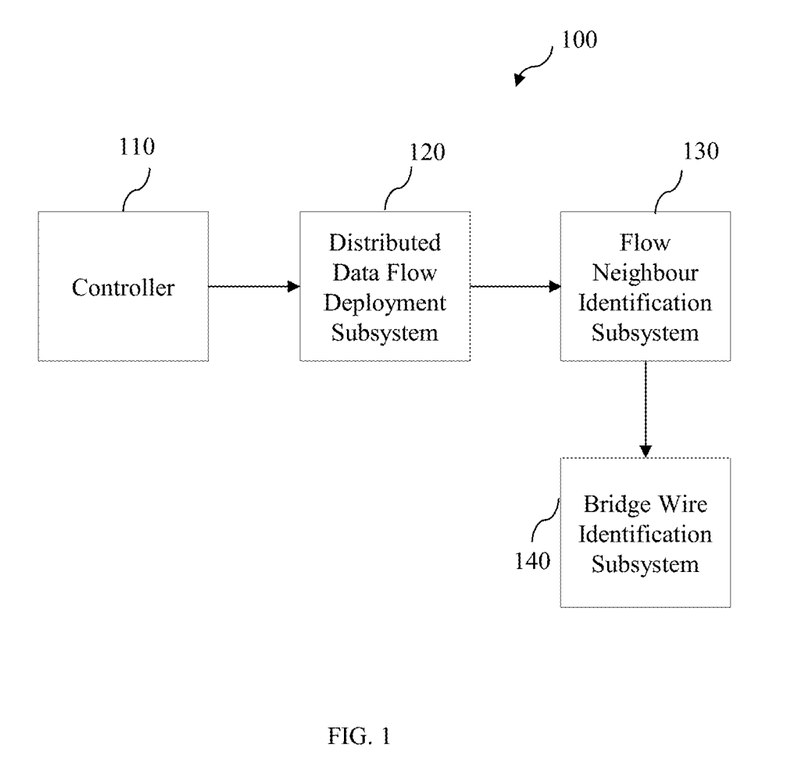
FIG. 1 is a block diagram of a system for implementing a distributed data flow framework in accordance with an embodiment of the present disclosure.

FIG. 1 is a block diagram of a system 100 for implementing a distributed data flow framework in accordance with an embodiment of the present disclosure. The system 100 includes a controller 110 configured to register at least one runtime 111 of the distributed data flow-based framework by capturing one or more distributed data flow details from a user. Each of the at least one runtime of the distributed data flow-based framework registers with the controller and shares its configuration information. If there is a change in the configuration of the at least one runtime, then the at least one runtime promptly updates the controller thus enabling the controller 110 to maintain a repository or a data store 112 of latest runtime configurations 113 for all runtimes. In one embodiment, the at least one runtime may include one or more compute nodes equipped with a predetermined functionality for execution of distributed data flow. The controller includes a visual flow-based editor 114 configured to capture the one or more distributed data flow details including a design of the distributed data flow framework.

Figure 2:
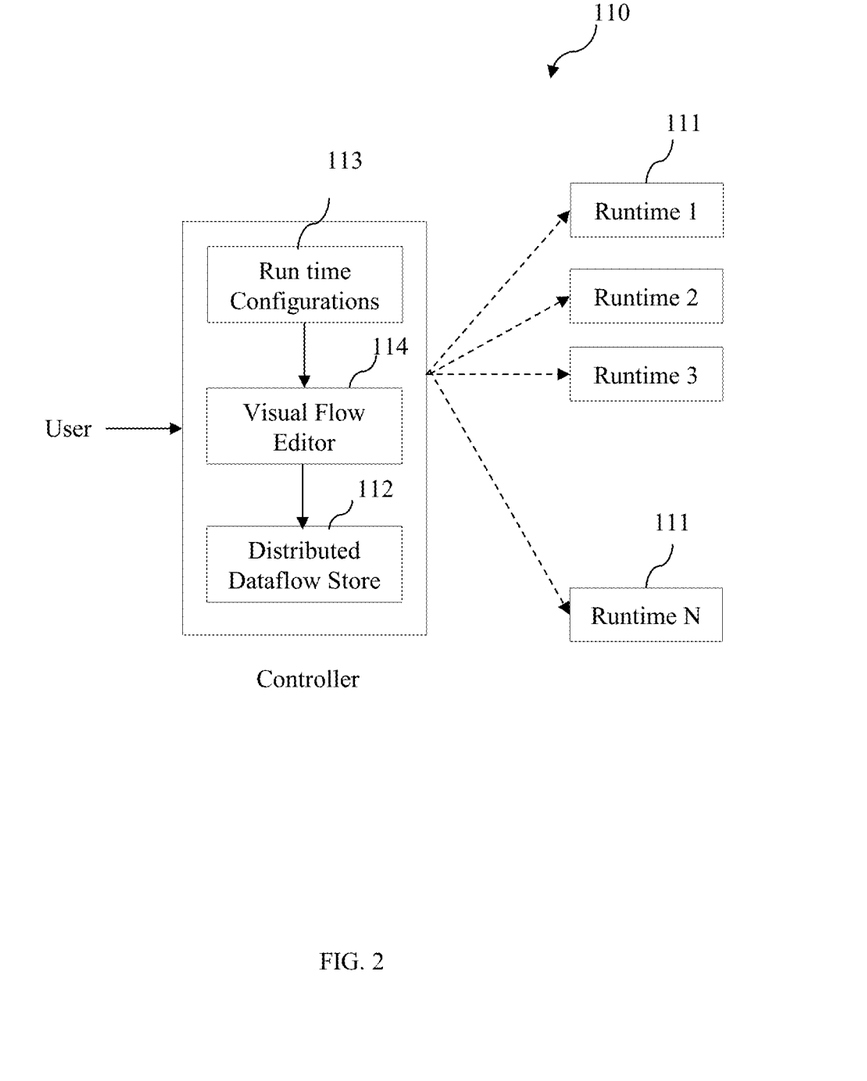
FIG. 2 illustrates a block diagram representation of a controller of a system for implementing a distributed data flow framework of FIG. 1 in accordance with an embodiment of the present disclosure.

The controller 110 is also configured to create a flow configuration file of a predefined format for the at least one runtime upon registration of the at least one runtime. In a specific embodiment, the flow configuration file may include a JavaScript object notation (JSON) file format including the data flow configuration information. As used herein, the term 'compute node' is defined as a node which provides ephemeral storage, networking, memory, and processing resources that is consumed by virtual machine instances. Similarly, the term 'distributed data flow (DDF)' is defined as one dataflow that is capable of running a portion of a directed acyclic graph (DAG) composed of 'nodes' and 'wires' independently. In one embodiment, the distributed dataflow-based framework may include a dataflow model distributed over the at least one runtime. One embodiment of the controller of a system for implementing the distributed data flow-based framework is depicted in FIG. 2.

The system 100 also includes a distributed data flow deployment subsystem 120 operatively coupled to the controller 110. The distributed data flow deployment subsystem 120 is configured to deploy one or more nodes and one or more interconnecting wires of the at least one runtime based on one or more identified portions of the distributed data flow framework from the flow configuration file created. As used herein, the term 'nodes' are defined as processing blocks in flow-based programming paradigm. The processing block or a processor, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof. In one embodiment, the one or more nodes may include one or more input ports and one or more output ports. Similarly, the term 'one or more interconnecting wires' are defined as flow of messages from an output port of a node to an input port of another node. The one or more interconnecting wires are represented internally as JSON objects with necessary and sufficient contract to support functionality and connectivity of the one or more nodes.

The system 100 also includes a flow neighbour identification subsystem 130 operatively coupled to the distributed data flow deployment subsystem 120. The flow neighbour identification subsystem 130 is configured to identify one or more flow neighbours associated with the at least one runtime of the distributed data flow-based framework based on data flow configuration information extracted from the flow configuration file created. As used herein, the term 'one or more flow neighbours' are defined as two runtimes that have at least one bridge wire between them. Again, the term 'bridge wire' is defined as a wire in a flow that crosses the runtime boundaries. In one embodiment, the data flow configuration information may include at least one of a flow design of the one or more nodes, one or more node configurations, one or more interconnecting wires, one or more runtime configurations or a combination thereof. In such embodiment, the one or more runtime configurations may include, but not limited to, port numbers, internet protocol (IP) address and public key information of the public-key cryptography and the like. In one embodiment, the port numbers may include pre-determined port numbers for publisher and subscriber services.

The flow neighbour identification subsystem 130 is also configured to determine a publisher and subscriber service information for each of the one or more flow neighbours identified based on the data flow configuration information extracted. As used herein, the term 'publisher' is defined as an entity responsible for posting messages to a topic. Similarly, the term 'subscriber' is defined as an application which registers itself with a desired topic in order to receive the appropriate messages. Again, the term 'topic' is defined as an intermediary channel that maintains a list of subscribers to relay messages to that are received from publishers. In one embodiment, the publisher-subscriber service information may include registration information of the publisher and the subscriber with a unique topic between the at least one runtime and the one or more flow neighbours.

The system 100 also includes a bridge wire identification subsystem 140 operatively coupled to the flow neighbour identification subsystem 130. The bridge wire identification subsystem 140 is configured to identify one or more socket roles and a unique identification number corresponding to each of the one or more flow neighbours from the flow configuration file upon determination of the publisher and the subscriber service information. In one embodiment, the one or more socket roles may include an initiate socket role. In another embodiment, the socket role may include an accept socket role. Publisher-subscriber models with the publisher-subscriber relationship solve the problem of 'one to many' and 'many to one' connections needed for the distributed data flow-based framework.

The bridge wire identification subsystem 140 is also configured to enable the at least one runtime to establish a transmission control protocol connection with each of the one or more flow neighbours based on an identification of corresponding one or more socket roles and the unique identification number. In one embodiment, the transmission control protocol (TCP) connection enables transmission control protocol (TCP) keepalives for preventing deactivation of the established transmission control protocol connection. The TCP connection may be secure or insecure depending on the deployment environment. A dedicated TCP connection is not created for each bridge wire instead a single TCP connection is established between each pair of flow neighbours from each of the one or more runtimes. In some cases, certain publisher/subscriber implementations may not allow sharing of a single TCP connection by both the publisher and the subscriber service. In such cases, a pair of TCP connections may be necessary to support one or more bridge wires in both directions. Since the performance and memory consumption of runtime depends on the number of TCP connections, this approach improves scalability as the number of TCP connections increases linearly with the number of runtimes instead of the number of bridge wires in the DDF framework.

The bridge wire identification subsystem 140 is also configured to enable the at least one runtime to establish a publisher-subscriber relationship for forwarding flow messages based on the transmission control protocol connection established between the at least one run-time and the one or more flow neighbours. In one embodiment, the publisher-subscriber relationship may include a relationship between a peer to peer publisher on a message originating runtime and a subscriber on a message receiving runtime. The distributed data flow (DDF) framework deployed entirely in the private network within an administrative domain may not have much security concerns. Implementation must ensure that each of the one or more runtimes are authenticated before setting up one or more bridge wires and messages are encrypted to ensure data privacy. Such implementations employing public key cryptography for bridge wire transport must ensure that the public keys of runtimes are shared at advance. This information may be included in the runtime configuration information section of a flow configuration file that is propagated to each of the one or more runtimes during DDF deployment phase. Each of the one or more runtime may periodically or on-demand refreshes key pair to improve the security posture of the overall system. Upon key pair refresh, each of the one or more runtimes may communicate a new public key to the controller which in turn updates DDF with the new key. In such embodiment, the implementation of key pair refreshes may be triggered at configured intervals.

The bridge wire identification subsystem 140 is also configured to implement one or more bridge wires with the at least one runtime and the one or more flow neighbours for implementation of the distributed data flow-based framework based on the publisher-subscriber relationship established. An autonomous set up of the one or more bridge wires without central broker includes having complete details of the one or more flow neighbour's reachability. The TCP connection setup between any two runtimes requires one of the runtimes to initiate a connection in INITIATE socket role while the other runtime has been listening for connection in ACCEPT socket role regardless of which of the publisher and subscriber services makes use of the transmission control protocol (TCP) connection. Each of the one or more runtimes includes the unique identification number (UID) which is assigned at the time of provisioning. The UIDs and socket roles are included as part of each of the one or more runtime's configuration in a flow file, such that a runtime always knows UID and the socket role of the one or more flow neighbours. When a pair of the one or more flow neighbours with identical socket roles try to set up a connection between them, they independently resolve and arrive at their final socket operation. The one or more flow neighbours with larger UID applies socket operation as per the corresponding socket role while its partner runtime applies a complementary socket operation.

In one embodiment, the bridge wire identification subsystem 140 is configured to implement the one or more bridge wires with the at least one runtime and the one or more flow neighbours in a private network in absence of a firewall. In such embodiment, implementing the one or more bridge wires in the private or on-premises network may include absence of firewalls which prevent runtime to either initiate or accept TCP connections with others. One such embodiment of the private network scenario with implementation of the one or more bridge wires are represented in FIG. 3.

Figure 3:
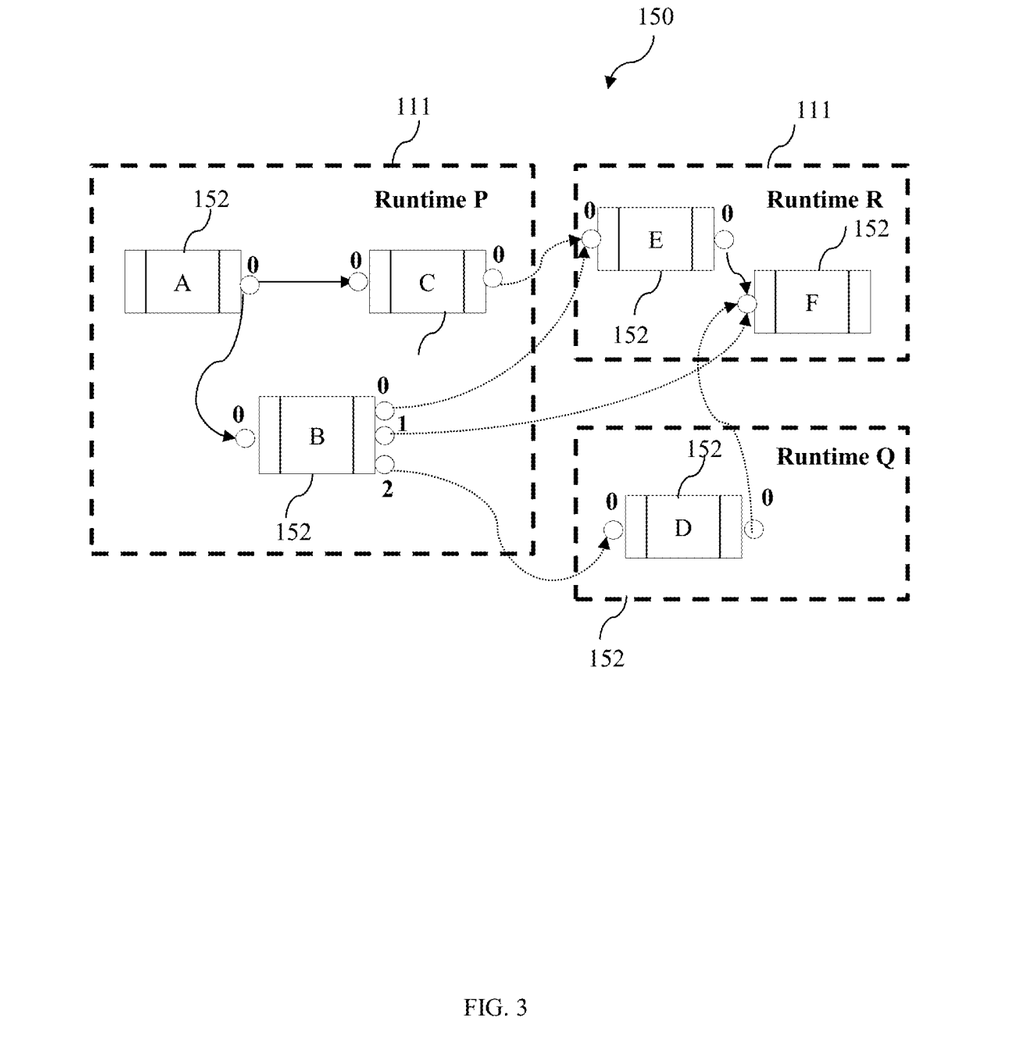
FIG. 3 illustrates an embodiment of a private network scenario of a system for implementing a distributed data flow framework of FIG. 1 in accordance with an embodiment of a present disclosure.

FIG. 3 illustrates a block diagram representation of an embodiment of a private network of a system 100 for implementing a distributed data flow framework of FIG. 1 in accordance with an embodiment of a present disclosure. In a private network 150, it is assumed that there are no firewalls that prevent a runtime to either initiate or accept TCP connections with others. All runtimes with one or more nodes 152 in such a scenario assume default socket role and successfully establish bridge wires between flow neighbours autonomously. The private network as used herein includes three runtimes 111 such as P, Q and R respectively.
Assuming UID(P)>UID (R)>UID (Q):
P(a)->R(b) indicates: P is in socket role a, R is in socket role b, and a connection initiated by P is accepted by R. P->R is a resulting connection.
Connection Setup:
P(ACCEPT)->Q(ACCEPT),
P(ACCEPT)->R(ACCEPT) and
R(ACCEPT)->Q(ACCEPT)
Publisher Setup:
P creates publishers on topics C0-E0, B0-E0, and B1-F0 and binds them to connection P->Q
P creates publisher on topic B2-D0 and binds it to connection P->R
R creates publisher on topic D0-F0 and binds it to connection R->Q
Subscriber Setup:
R creates subscriber on topic B2-D0 and binds it to connection P->R
Q creates subscribers on topics C0-E0, B0-E0 and B1-F0 and binds them to connection P->Q
Q creates subscriber on topic D0-F0 and binds it to connection R->Q In another embodiment, the bridge wire identification subsystem is configured to implement the one or more bridge wires with the at least one runtime and the one or more flow neighbours in a hybrid network of a public-private network across presence of a firewall. The firewall protects resources on enterprise networks from malicious agents from accessing via public networks, such as the internet. The firewall allows an inside user on enterprise networks to initiate a connection to an outside host such as a website on the internet but does not allow any connection to be originated from outside to an inside resource. Additionally, the firewalls are present to protect critical assets on operational networks from inadvertent access from corporate's own IT network. One such embodiment of the hybrid network scenario is depicted in FIG. 4.

Figure 4:
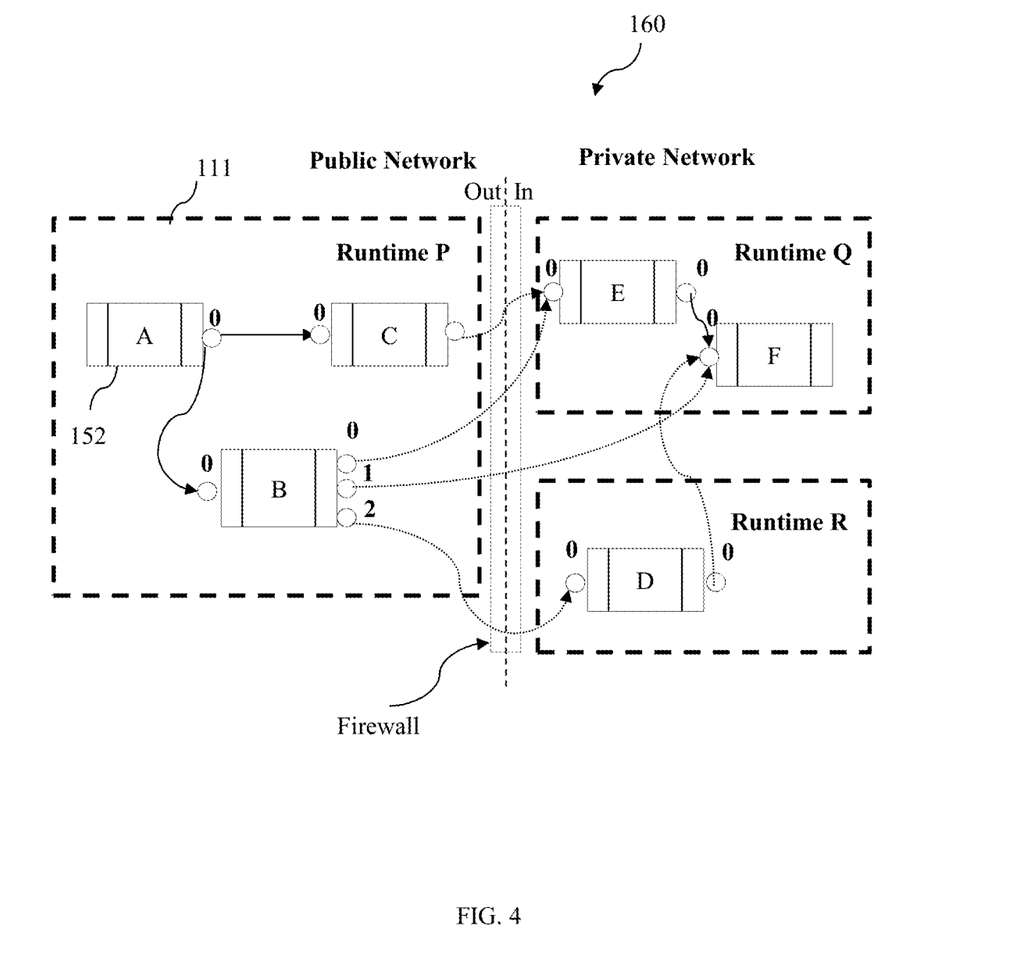
FIG. 4 illustrates an embodiment of a block diagram representation of a hybrid network scenario of a system for implementing a distributed data flow framework of FIG. 1 in accordance with an embodiment of a present disclosure.

FIG. 4 depicts a block diagram representation of a hybrid network scenario 160 of a system for implementing a distributed data flow framework of FIG. 1 in accordance with an embodiment of the present disclosure. Assuming in the hybrid network 160, runtime P 111 in socket role a is on the outside network of a firewall 165 (example: public cloud) and flow neighbour R in socket role b is on the inside network (corporate network) of firewall.

Here, the runtime P is on a public network and in ACCEPT socket role. Runtimes Q and R on a private network behind a firewall and are in INITIATE socket role.

Assuming UID(P)>UID(R)->UID(Q), then the DDF is implemented in the hybrid network scenario as follows:
Connection Setup:
Q(INITIATE)->P(ACCEPT),
R(INITIATE)->P(ACCEPT), and,
R(INITIATE)->Q(INITIATE)
Publisher Setup:
P Creates Publishers on Topics C0-E0, B0-E0, and B1-F0 and binds them to Connection Q->P
P creates publisher on topic B2-D0 and binds it to connection R->P
R creates publisher on topic D0-F0 and binds it to connection R->Q
Subscriber Setup:
R creates subscriber on topic B2-D0 and binds it to connection R->P
Q creates subscribers on topics C0-E0, B0-E0 and B1-F0 and binds them to connection Q->P
Q creates subscriber on topic D0-F0 and binds it to connection R->Q In yet another embodiment, the bridge wire identification subsystem 140 is configured to implement the one or more bridge wires with the at least one runtime and the one or more flow neighbours in a hierarchy of networks protected by one or more firewalls. One such embodiment of hierarchies of the one or more networks are represented in FIG. 5.

Figure 5:
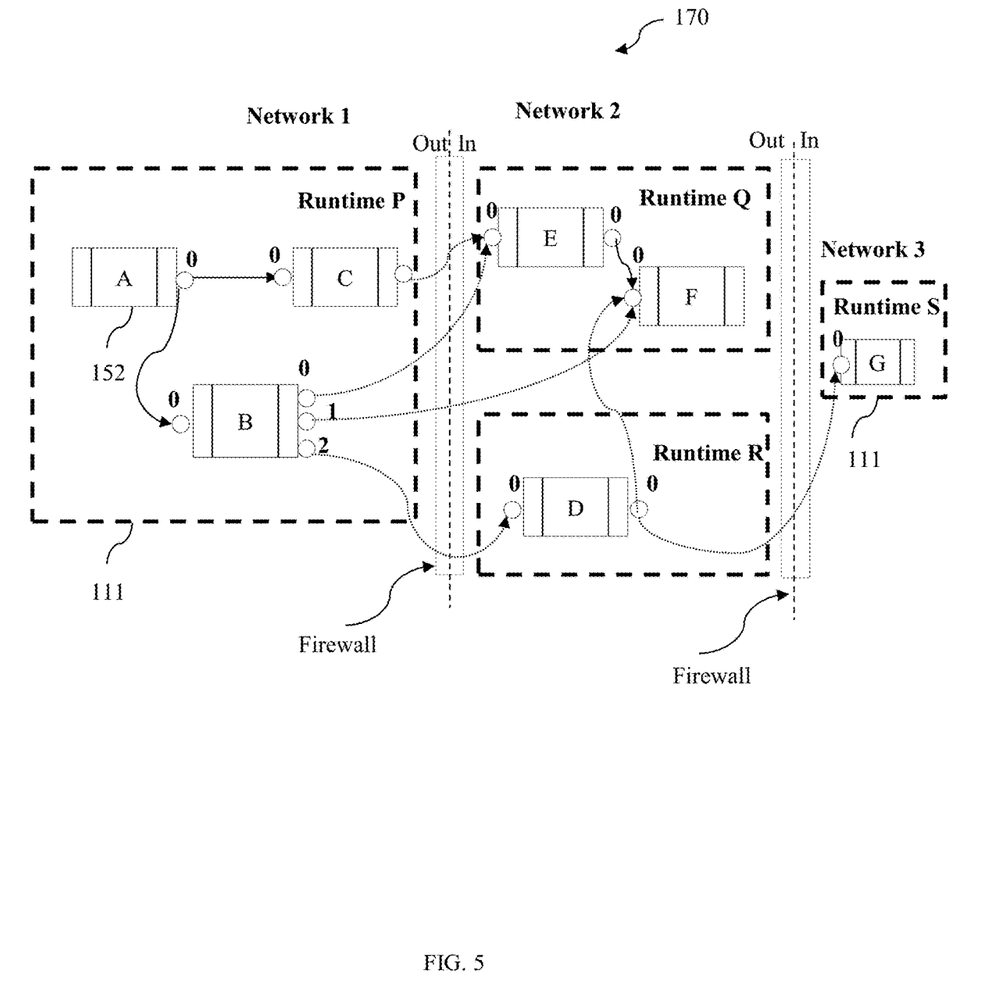
FIG. 5 represents a block diagram representation of an embodiment of hierarchies of three networks protected by firewalls of a system for implementing a distributed data flow framework of FIG. 1 in accordance with an embodiment of the present disclosure.

FIG. 5 represents a block diagram representation of an embodiment of hierarchies of three networks 170 protected by firewalls of a system for implementing a distributed data flow framework of FIG. 1 in accordance with an embodiment of the present disclosure. Assuming that runtimes 111 spread across three hierarchies of networks 170 protected by firewalls 165:
P(ACCEPT), Q(ACCEPT), X(ACCEPT), Y(ACCEPT) and A(INITIATE), B(INITIATE)
By choosing UID range for P&Q>UID range for X&Y>UID range for A&B
X(INITIATE) or Y(INITIATE)->P(ACCEPT) or Q (ACCEPT),
A(INITIATE) or B(INITIATE)->X(ACCEPT) or Y(ACCEPT), and
A(INITIATE) or B(INITIATE)->P(ACCEPT) or Q(ACCEPT)

Again, by choosing UID(P)>UID(Q) & UID(R)>UID(S):
The scenario in the hierarchies of network becomes:
Q(ACCEPT)->P(ACCEPT),
R(ACCEPT)->P(ACCEPT),
S(INITIATE)->R(ACCEPT) and
R(ACCEPT)->Q(ACCEPT), if UID(Q)>UID(R), else Q(ACCEPT)->R(ACCEPT).

Figure 6:
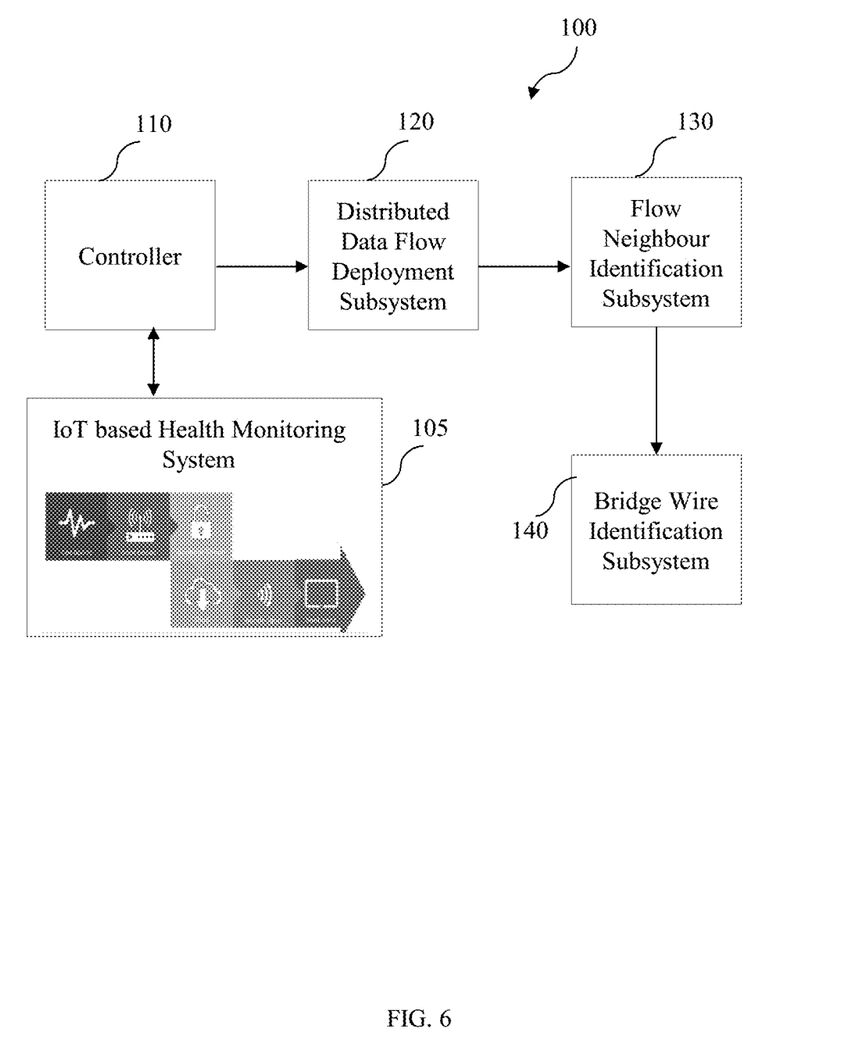
FIG. 6 illustrates a schematic representation of an exemplary embodiment of a system for implementing a distributed data flow framework of FIG. 1 in accordance with an embodiment of the present disclosure.

FIG. 6 illustrates a schematic representation of an exemplary embodiment of a system 100 for implementing a distributed data flow framework of FIG. 1 in accordance with an embodiment of the present disclosure. The system 100 is well suited for IoT (internet of things) applications in which data originates from non-human sources such as sensors/machines and eventually consumed for further processing. Considering an example of an IoT technology-based healthcare monitoring system 105. In such a system, health parameters of users are fetched in raw format from a wearable device associated with the user and further utilized for processing. The data ingested from the sensors of the wearable device are stored in the database or handed off to other application entities to collect, analyze and act based on the data. Based on the data gathered from the non-human resources, the system 100 provides a design & implementation methodology for a distributed flow-based framework for the IoT based healthcare monitoring system. The system takes Node-RED as a distributed data flow framework and shows how it can be extended to support DDFs in a scalable way.

The system 100 for implementation of the distributed data flow framework (DDF) includes a controller 110. The controller registers the at least one runtime of the distributed data flow-based framework by capturing one or more distributed data flow details from a user. For example, each of the at least one runtime of the distributed data flow-based framework registers with the controller and shares its configuration information. If there is a change in the configuration of the at least one runtime, then the at least one runtime promptly updates the controller thus enabling the controller to maintain a repository of latest configurations for all runtimes. In one embodiment, the at least one runtime may include one or more compute nodes equipped with a predetermined functionality for execution of distributed data flow. The controller is also configured to create a flow configuration file such as JSON file format for the at least one runtime. For example, the at least one runtime may include one or more nodes interconnected with one or more wires, wherein the one or more nodes are processing blocks which are distributed and responsible for processing and analysis of the health care monitoring system.

Once, the flow configuration file is created, a distributed data flow deployment subsystem 120 deploys one or more nodes and one or more interconnecting wires of the at least one runtime based on one or more identified portions of the distributed data flow framework from the flow configuration file. Again, a flow neighbour identification subsystem 130 identifies one or more flow neighbours associated with the at least one runtime of the distributed data flow-based framework based on data flow configuration information extracted from the flow configuration file. For example, the flow configuration file may include at least one of a flow design of the one or more nodes, one or more node configurations, one or more interconnecting wires, one or more runtime configurations or a combination thereof.

Also, the flow neighbour identification subsystem 130 determines a publisher and subscriber service information for each of the one or more flow neighbours identified based on the data flow configuration information extracted. The flow neighbour identification subsystem also enables use of peer-to-peer pub/sub clients over point-to-point connections to implement bridge wires in the DDF that cross runtime boundaries. In the DDF framework, each of the at least one runtime has knowledge of the entire DDF and latest configuration of the one or more flow neighbours with which it has bridge wire attachments.

Further, a bridge wire identification subsystem 140, upon determination of one or more flow neighbours, identifies one or more socket roles and a unique identification number (UID) corresponding to each of the one or more flow neighbours. Based on the one or more socket roles, the bridge wire identification subsystem 140 enables each of the at least one runtime independently, without centralized coordination to establish point to point, secure transmission control protocol (TCP) connections with its flow neighbours and set up pub/sub relationships for forwarding flow messages. The TCP connection may be secure or insecure depending on the deployment environment. Further, the bridge wire identification subsystem implements one or more bridge wires with the at least one runtime and the one or more flow neighbours for implementation of the distributed data flow-based framework based on the publisher-subscriber relationship established. Thus, the system 100 with the one or more bridge wires are similar to unreliable datagram service and such a system is efficient and guarantees message delivery, leading to a reliable TCP service and hence helps in successful implementation of the DDF.

Figure 7:
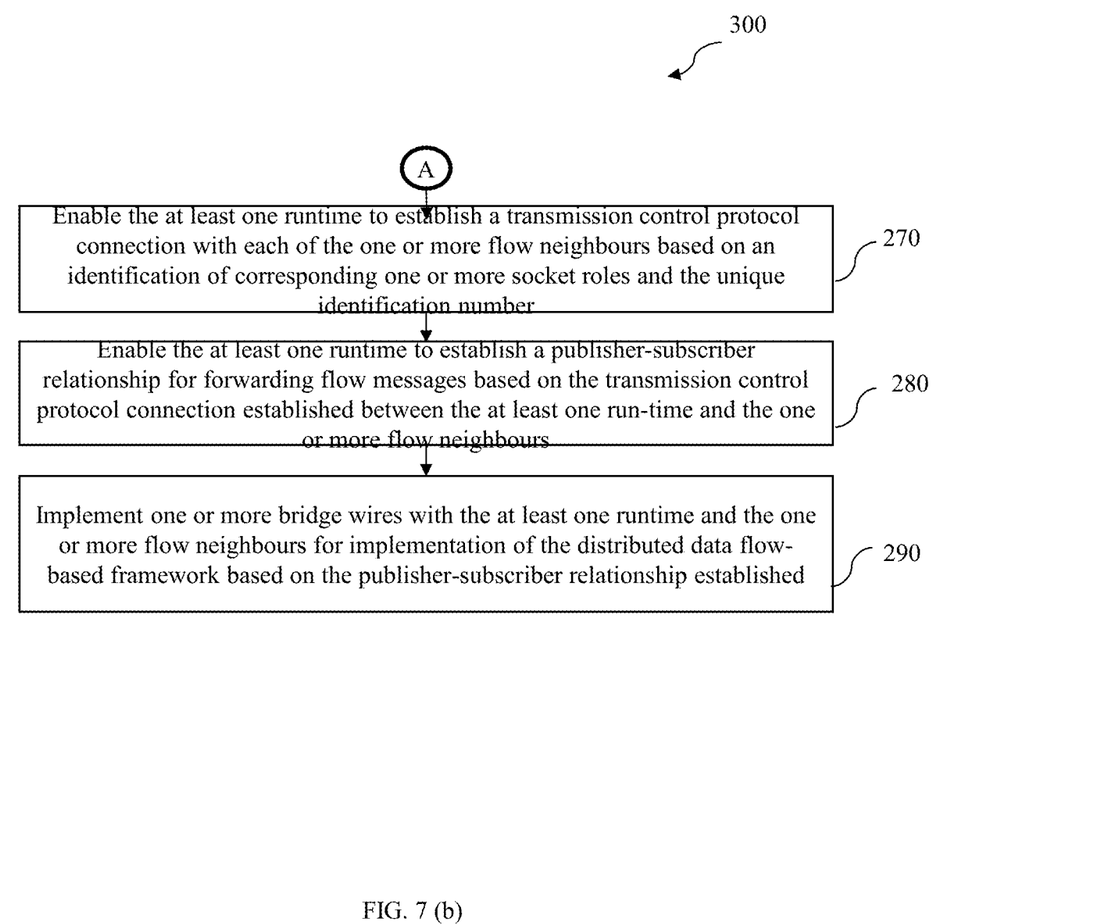
Figure 7A:
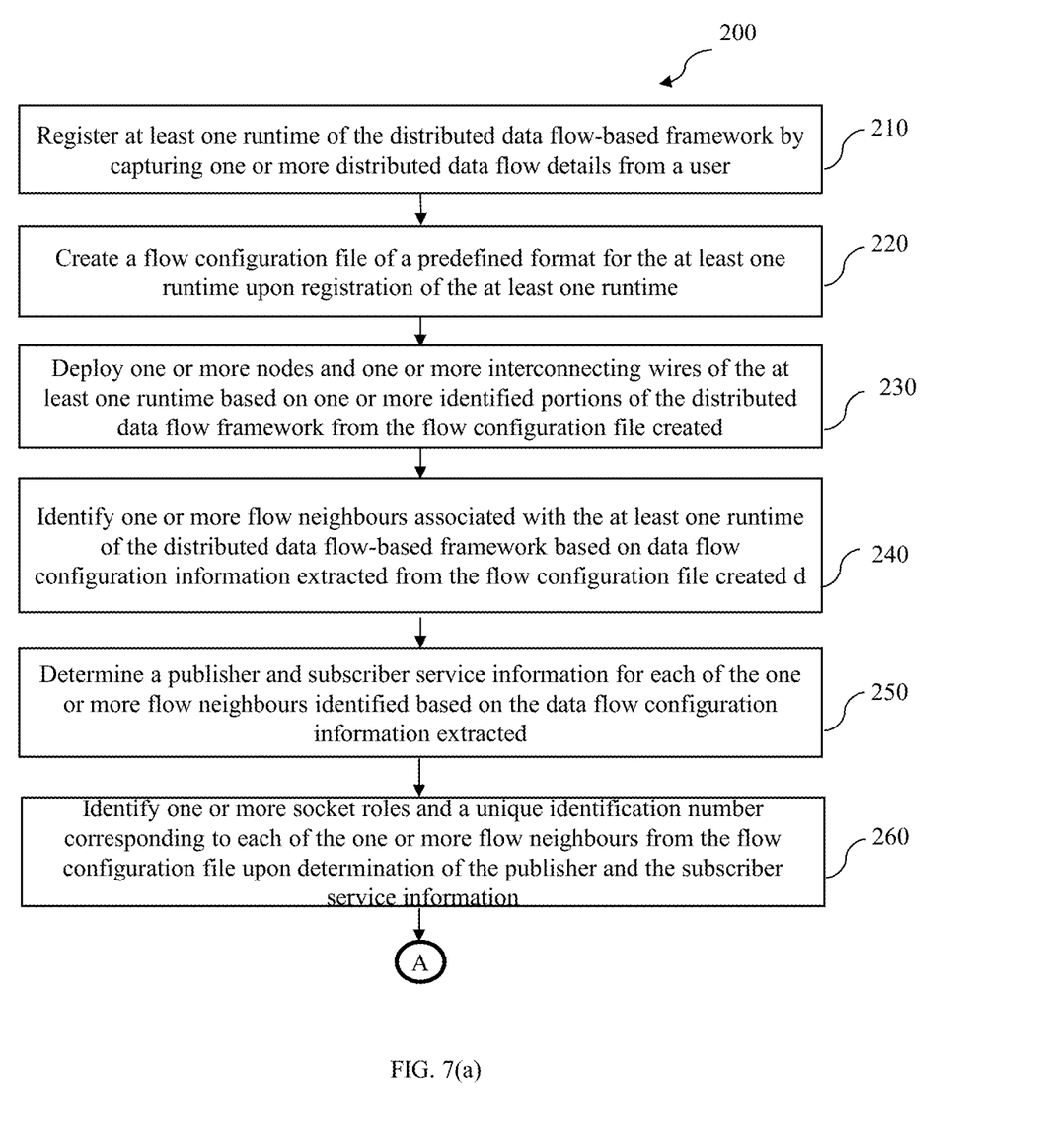

FIG. 7(*a*) and FIG. 7(*b*) is a flow chart representing the steps involved in a method 200 for implementing a distributed data flow framework in accordance with the embodiment of the present disclosure. The method includes registering, by a controller, at least one runtime of the distributed data flow-based framework by capturing one or more distributed data flow details from a user in step 210. In one embodiment, registering the at least one runtime may include registering one or more compute nodes equipped with a predetermined functionality for execution of distributed data flow. In such embodiment, the distributed data flow-based framework may include a Node-RED$^R$ flow-based development tool for wiring together one or more hardware devices. The method 200 also includes creating, by the controller, a flow configuration file of a predefined format for the at least one runtime upon registration of the at least one runtime in step 220. In one embodiment, creating the flow configuration file may include creating a JavaScript object notation (JSON) file format including the data flow configuration information. In such embodiment, the data flow configuration information may include at least one of a flow design of the one or more nodes, one or more node configurations, one or more interconnecting wires, one or more runtime configurations or a combination thereof. In such embodiment, the one or more runtime configurations may include, but not limited to, port numbers, internet protocol (IP) address and public key information of the public-key cryptography and the like.

The method 200 also includes deploying, by a distributed data flow deployment subsystem, one or more nodes and one or more interconnecting wires of the at least one runtime based on one or more identified portions of the distributed data flow framework from the flow configuration file created in step 230. In one embodiment, deploying the one or more nodes may include deploying the one or more nodes having one or more input ports and one or more output ports. In another embodiment, deploying the one or more interconnecting wires may include deploying the one or more nodes as JSON objects with necessary and sufficient contract to support functionality and connectivity of the one or more nodes.

The method 200 also includes identifying, by a flow neighbour identification subsystem, one or more flow neighbours associated with the at least one runtime of the distributed data flow-based framework based on data flow configuration information extracted from the flow configuration file created in step 240. In one embodiment, identifying the one or more flow neighbours may include identifying multiple runtimes having at least one bridge wire between them. The method 200 also includes determining, by the flow neighbour identification subsystem, a publisher and subscriber service information for each of the one or more flow neighbours identified based on the data flow configuration information extracted in step 250.

The method 200 also includes identifying, by a bridge wire identification subsystem, one or more socket roles and a unique identification number corresponding to each of the one or more flow neighbours from the flow configuration file upon determination of the publisher and the subscriber service information in step 260. In one embodiment, identifying the one or more socket roles may include identifying an initiate socket role. In another embodiment, identifying the one or more socket roles may include identifying an accept socket role.

The method 200 also includes enabling, by the bridge wire identification subsystem, the at least one runtime to establish a transmission control protocol connection with each of the one or more flow neighbours based on an identification of corresponding one or more socket roles and the unique identification number in step 270. In some embodiment, enabling the at least one runtime to establish the transmission control protocol connection may include enabling transmission control protocol (TCP) keepalives for preventing deactivation of the established transmission control protocol connection.

The method 200 also includes enabling, by the bridge wire identification subsystem, the at least one runtime to establish a publisher-subscriber relationship for forwarding flow messages based on the transmission control protocol connection established between the at least one run-time and the one or more flow neighbours in step 280. In one embodiment, enabling the at least one runtime to establish the publisher-subscriber relationship for forwarding the flow messages may include enabling the at least one runtime to establish a relationship between a peer to peer publisher on a message originating runtime and a subscriber on a message receiving runtime.

The method 200 also includes implementing, by the bridge wire identification subsystem, one or more bridge wires with the at least one runtime and the one or more flow neighbours for implementation of the distributed data flow-based framework based on the publisher-subscriber relationship established in step 290. In one embodiment, implementing the one or more bridge wires with the at least one runtime and the one or more flow neighbours for implementation of the distributed data flow-based framework may include implementing the one or more bridge wires with the at least one runtime and the one or more flow neighbours in a private network in absence of a firewall. In another embodiment, implementing the one or more bridge wires with the at least one runtime and the one or more flow neighbours for implementation of the distributed data flow-based framework may include implementing the one or more bridge wires with the at least one runtime and the one or more flow neighbours in a hybrid network of a public-private network across presence of a firewall. In yet another embodiment, implementing the one or more bridge wires with the at least one runtime and the one or more flow neighbours for implementation of the distributed data flow-based framework may include implementing the one or more bridge wires with the at least one runtime and the one or more flow neighbours in a hierarchy of networks protected by one or more firewalls.

Various embodiments of the present disclosure enable elimination of centralized message broker which improves system resilience by also eliminating a single point of failure in the data plane. This enables a significant portion of distributed data flow processing at the edge of the network where internet of tings (IoT) data originates without incurring additional costs involved in sending data to the message broker.

Moreover, the present disclosed system enables direct transport of flow messages between runtime neighbours or peer to peer messaging which reduces the latency and supports real-time processing requirements of time-critical applications.

Furthermore, the present disclosed system improves overall security posture of a distributed data flow based (DDF) framework when runtimes need to use public networks for communication without a need to modify existing firewall configurations. Also, the present disclosed system reduces the complexity & cost of overall DDF framework implementation by eliminating the need to install one or more message queuing telemetry transport (MQTT) message brokers.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for implementation of a distributed data flow-based framework comprising:
   a controller configured to:
     register at least one runtime of the distributed data flow-based framework by capturing one or more distributed data flow details from a user; and
     create a flow configuration file of a predefined format for the at least one runtime upon registration of the at least one runtime;
   a distributed data flow deployment subsystem operatively coupled to the controller, wherein the distributed data flow deployment subsystem is configured to deploy one or more nodes and one or more interconnecting wires of the at least one runtime based on one or more identified portions of the distributed data flow framework from the flow configuration file created;
   a flow neighbour identification subsystem operatively coupled to the distributed data flow deployment subsystem, wherein the flow neighbour identification subsystem is configured to:
     identify one or more flow neighbours associated with the at least one runtime of the distributed data flow-based framework based on data flow configuration information extracted from the flow configuration file created; and
     determine a publisher and subscriber service information for each of the one or more flow neighbours identified based on the data flow configuration information extracted; and
   a bridge wire identification subsystem operatively coupled to the flow neighbour identification subsystem, wherein the bridge wire identification subsystem is configured to:
     identify one or more socket roles and a unique identification number corresponding to each of the one or more flow neighbours from the flow configuration file upon determination of the publisher and the subscriber service information;
     enable the at least one runtime to establish a transmission control protocol connection with each of the one or more flow neighbours based on an identification of corresponding one or more socket roles and the unique identification number;
     enable the at least one runtime to establish a publisher-subscriber relationship for forwarding flow messages based on the transmission control protocol connection established between the at least one run-time and the one or more flow neighbours; and
     implement one or more bridge wires with the at least one runtime and the one or more flow neighbours for implementation of the distributed data flow-based framework based on the publisher-subscriber relationship established.

2. The system of claim 1, wherein the at least one runtime comprises one or more compute nodes equipped with a predetermined functionality for execution of distributed data flow.

3. The system of claim 1, wherein the distributed data flow-based framework comprises a dataflow model distributed over the at least one runtime.

4. The system of claim 1, wherein the controller comprises a visual flow-based editor configured to capture the one or more distributed data flow details comprising a design of the distributed data flow framework.

5. The system of claim 1, wherein the predefined format of the flow configuration file comprises a JavaScript object notation file format comprising the data flow configuration information.

6. The system of claim 1, wherein the data flow configuration information comprises at least one of a flow design of the one or more nodes, one or more node configurations, one or more interconnecting wires, one or more runtime configurations or a combination thereof.

7. The system of claim 1, wherein the one or more nodes comprises one or more processing units comprising one or more input ports and one or more output ports.

8. The system of claim 1, wherein the publisher and the subscriber service information comprise registration information of a publisher and a subscriber with a unique topic between the at least one runtime and the one or more flow neighbours.

9. The system of claim 1, wherein the one or more socket roles comprises an initiate socket role and an accept socket role.

10. The system of claim 1, wherein the transmission control protocol connection is configured to enable transmission control protocol keepalives for preventing deactivation of the established transmission control protocol connection.

11. The system of claim 1, wherein the publisher-subscriber relationship comprises a relationship between a peer to peer publisher on a message originating runtime and a subscriber on a message receiving runtime.

12. The system of claim 1, wherein the bridge wire identification subsystem is configured to implement the one or more bridge wires with the at least one runtime and the one or more flow neighbours in a private network in absence of a firewall.

13. The system of claim 1, wherein the bridge wire identification subsystem is configured to implement the one or more bridge wires with the at least one runtime and the one or more flow neighbours in a hybrid network of a public-private network across presence of a firewall.

14. The system of claim 1, wherein the bridge wire identification subsystem is configured to implement the one or more bridge wires with the at least one runtime and the one or more flow neighbours in a hierarchy of networks protected by one or more firewalls.

15. The system of claim 1, wherein the distributed data flow-based framework is implemented by recovering from one or more link failures and network congestion based on a utilization of one or more resiliency mechanisms.

16. A method comprising:
registering, by a controller, at least one runtime of the distributed data flow-based framework by capturing one or more distributed data flow details from a user;
creating, by the controller, a flow configuration file of a predefined format for the at least one runtime upon registration of the at least one runtime;
deploying, by a distributed data flow deployment subsystem, one or more nodes and one or more interconnecting wires of the at least one runtime based on one or more identified portions of the distributed data flow framework from the flow configuration file created;
identifying, by a flow neighbour identification subsystem, one or more flow neighbours associated with the at least one runtime of the distributed data flow-based framework based on data flow configuration information extracted from the flow configuration file created;
determining, by the flow neighbour identification subsystem, a publisher and subscriber service information for each of the one or more flow neighbours identified based on the data flow configuration information extracted;
identifying, by a bridge wire identification subsystem, one or more socket roles and a unique identification number corresponding to each of the one or more flow neighbours from the flow configuration file upon determination of the publisher and the subscriber service information;
enabling, by the bridge wire identification subsystem, the at least one runtime to establish a transmission control protocol connection with each of the one or more flow neighbours based on an identification of corresponding one or more socket roles and the unique identification number;
enabling, by the bridge wire identification subsystem, the at least one runtime to establish a publisher-subscriber relationship for forwarding flow messages based on the transmission control protocol connection established between the at least one run-time and the one or more flow neighbours; and
implementing, by the bridge wire identification subsystem, one or more bridge wires with the at least one runtime and the one or more flow neighbours for implementation of the distributed data flow-based framework based on the publisher-subscriber relationship established.

* * * * *